United States Patent
Leone et al.

(10) Patent No.: US 12,195,176 B2
(45) Date of Patent: Jan. 14, 2025

(54) ROTOR NEUTRAL POSITIONS FOR AN AIRCRAFT

(71) Applicant: Lockheed Martin Corporation, Bethesda, MD (US)

(72) Inventors: Adam A. Leone, Newtown, CT (US); Stephen Kubik, Newtown, CT (US); Kevin Wrona, Milford, CT (US); Benjamin J. Williamson, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 358 days.

(21) Appl. No.: 17/747,829

(22) Filed: May 18, 2022

(65) Prior Publication Data

US 2023/0373618 A1 Nov. 23, 2023

(51) Int. Cl.
*B64C 27/57* (2006.01)
*B64C 27/04* (2006.01)

(52) U.S. Cl.
CPC .............. *B64C 27/57* (2013.01); *B64C 27/04* (2013.01)

(58) Field of Classification Search
CPC ................................ B64C 27/57; B64C 27/04
See application file for complete search history.

(56) References Cited

U.S. PATENT DOCUMENTS

| | | | | |
|---|---|---|---|---|
| 7,988,089 B2* | 8/2011 | Wittmer | ................ | B64C 27/605 244/228 |
| 8,231,085 B2* | 7/2012 | Cherepinsky | ........ | G05D 1/0858 244/236 |
| 8,939,394 B1* | 1/2015 | Sonneborn | .............. | B64C 27/57 244/17.11 |
| 10,562,609 B2 | 2/2020 | Litwinowicz et al. | | |
| 10,809,744 B2* | 10/2020 | White | ................... | B64C 13/503 |
| 10,890,924 B2* | 1/2021 | Worsham, II | .......... | G01C 23/00 |
| 11,325,695 B2* | 5/2022 | Caputo | ................. | B64C 27/473 |
| 2013/0325221 A1* | 12/2013 | Shue | .................... | G05D 1/0676 701/16 |
| 2014/0027565 A1* | 1/2014 | Marvin | ................ | G05D 1/0816 244/17.13 |
| 2016/0325830 A1* | 11/2016 | Waltner | ................. | B64D 25/00 |
| 2017/0017241 A1* | 1/2017 | Gillett, Jr. | ................ | B64C 27/56 |
| 2017/0113792 A1* | 4/2017 | Vallart | .................... | B64C 27/57 |
| 2017/0210466 A1* | 7/2017 | Cherepinsky | ........... | B64C 27/06 |
| 2017/0291690 A1* | 10/2017 | Litwinowicz | ......... | B64C 13/044 |
| 2020/0047881 A1* | 2/2020 | Marzella | .............. | B64C 13/503 |

(Continued)

*Primary Examiner* — Mussa A Shaawat

(74) *Attorney, Agent, or Firm* — Michael Best & Friedrich LLP

(57) ABSTRACT

Systems and methods for transitioning between rotor positions based on detected parameters of an aircraft. One embodiment provides an aircraft comprising a rotor assembly and a controller. The controller is configured to monitor an operating characteristic of the aircraft. The controller is configured to select, in response to a rotor neutral state of the aircraft being enabled, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft. The controller is configured to set the selected one of the plurality of rotor neutral positions as the rotor neutral position for the aircraft.

20 Claims, 8 Drawing Sheets

(56) References Cited

U.S. PATENT DOCUMENTS

2021/0009252 A1    1/2021  Forte et al.
2021/0171190 A1*   6/2021  Bellera ................... B64C 25/52
2022/0315205 A1*  10/2022  Moy ..................... G05D 1/0858

* cited by examiner

ROTOR NEUTRAL POSITIONS FOR AN AIRCRAFT

GOVERNMENT SUPPORT

This invention was made with government support under HR0011-15-9-0004 awarded by the Defense Advanced Research Projects Agency. The government has certain rights in the invention.

FIELD OF INVENTION

Embodiments described herein relate to rotor neutral positions for aircrafts, and, in particular, transitioning between rotor positions based on detected parameters of an aircraft.

SUMMARY

A rotary aircraft, such as, for example, a rotary blade aircraft, generally includes an airframe with an extending tail. A main rotor assembly is located on the airframe and rotates about a main rotor axis. In some instances, the main rotor assembly is a rotor system having a flapping (e.g., tilting) degree of freedom, such as a single main rotor assembly or a tandem rotor configuration.

When a rotorcraft engages an engine start or stop sequence, a pilot may position the rotor in a rotor neutral position to avoid control inputs during the sequence and to avoid impacting the droop stops. The pilot may then adjust the rotor neutral position prior to take-off using a trim switch to achieve a vertical take-off with minimal compensation. Adjusting the rotor neutral position when transitioning between an engine start or stop sequence and a take-off sequence requires pilot input. The only visual inspection the pilot has of the rotor position is the rotor tip path plane as the rotor rotates. Accordingly, while the pilot may position the rotor visually before lifting, the pilot is unaware of the actual position of the rotor during flight.

Accordingly, to solve these and other problems, embodiments described herein provide systems and methods for automatically controlling the rotor neutral position (e.g., rotor state neutral) of an aircraft as a function of operational parameters of the aircraft, such as, for example, rotor speed. As one example, when the rotor speed is below a threshold and the rotor neutral position is enabled (e.g., a control stick is placed in a neutral position), the rotor assembly automatically transitions to a neutral state optimal for engine startup/shutdown. When the rotor speed is above a threshold and the rotor neutral position is enabled, the rotor assembly automatically transitions to a neutral state optimal for take-off of the aircraft. The automatic selection of the optimized rotor neural position from the two optimized positions provides repeatable rotor positions with reduced pilot input, which reduces pilot workload. Also, using an operating characteristic such as rotor speed to transition between neutral positions does not impact ground operations, such as ground taxi, by avoiding scheduling based on rotor position, which alone may not indicate the intended ground position. In particular, the rotor position may be low during ground taxi, but the pilot would not want the rotor to transition to the engine startup/shutdown position during ground taxi. Accordingly, by scheduling rotor neutral position as a function of rotor speed, there is a direct line between the intended ground operation and the rotor state neutral position and does not force a comprise between trim scheduling for engine startup/shutdown and ground taxi. However, it should be understood that other operating characteristics (or combinations of operating characteristics) may be used to automatically set a rotor neutral position as described herein.

One embodiment provides an aircraft comprising a rotor assembly and a controller. The controller is configured to monitor an operating characteristic of the aircraft. The controller is configured to select, in response to a rotor neutral state of the aircraft being enabled, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft. The controller is configured to set the selected one of the plurality of rotor neutral positions as the rotor neutral position for the aircraft.

Another embodiment provides a method for operating an aircraft. The method includes monitoring, with a controller, an operating characteristic of the aircraft. The method includes selecting, with the controller in response to a rotor neutral state being enabled for the aircraft, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft. The method includes setting the selected one of the plurality of rotor neutral positions as the rotor neutral position for the aircraft.

Another embodiment provides a control system. The control system includes a sensor configured to provide signals indicative of an operating characteristic of an aircraft, and a controller including an electronic processor and a memory. The controller is configured to receive the signals indicative of the operating characteristic. The controller is configured to select, in response to a rotor neutral state being enable, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft. The controller is configured to set the selected one of the plurality of rotor neutral positions as the rotor neutral position for the aircraft.

Other aspects will become apparent by consideration of the detailed description and accompanying drawings.

DETAILED DESCRIPTION

Figure 1A:
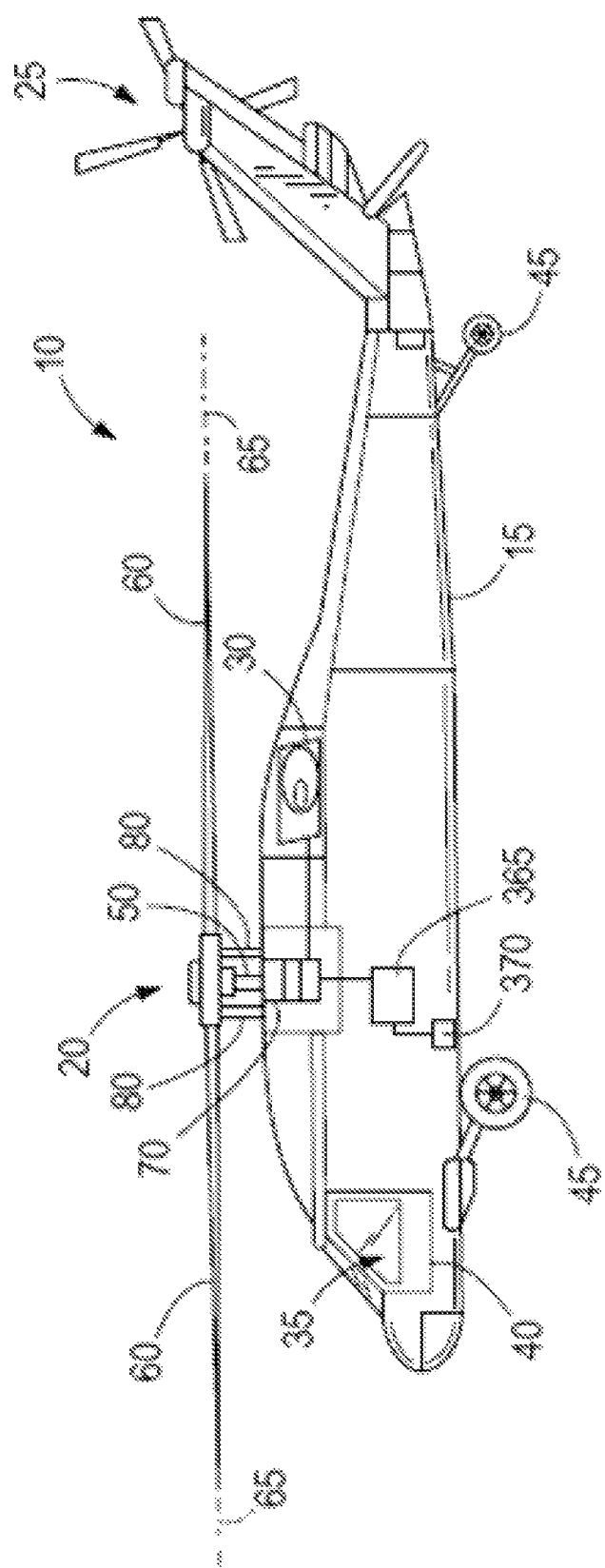
FIG. 1A illustrates a rotary blade aircraft according to an example embodiment.

Before any embodiments are explained in detail, it is to be understood that the embodiments described herein are provided as examples and the details of construction and the arrangement of the components described herein or illustrated in the accompanying drawings should not be considered limiting. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting, and coupling. Further, "connected" and "coupled" are not restricted to physical or mechanical connections or couplings, and may include electrical connections or couplings, whether direct or indirect. Also, electronic communications and data exchanges may be performed using any known means including direct connections, wireless connections, and the like.

It should be noted that a plurality of hardware and software-based devices, as well as a plurality of different structural components may be utilized to implement the embodiments described herein or portions thereof. In addition, it should be understood that embodiments described herein may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects described herein may be implemented in software (stored on non-transitory computer-readable medium) executable by one or more processors. As such, it should be noted that a plurality of hardware and software-based devices, as well as a plurality of different structural components may be used to implement the embodiments described herein. For example, "controller," "control unit," and "control assembly" described in the specification may include one or more processors, one or more memory modules including non-transitory computer-readable medium, one or more input/output interfaces, and various connections (for example, a system bus) connecting the components.

As noted above, in some situations, an aircraft pilot places the aircraft rotor assembly in a rotor neutral position. However, a pilot may need to manually adjust the default rotor neutral position based on the particular operational sequence being performed by the pilot, such as whether the sequence is an engine startup or shutdown sequence or a vertical take-off sequence. Embodiments described herein automatically transition between rotor neutral positions based on detected operational parameters of the aircraft. For example, an operating characteristic, such as, for example, rotational speed of the rotor assembly, is monitored. When the operating characteristic satisfies a first threshold (for example, the rotor speed is below a speed threshold), the aircraft is presumed to be in the startup or shutdown sequence, and the rotor neutral position is set to a first rotor neutral position. When the operating characteristic satisfies a second threshold (for example, the rotor speed is above or equal to a speed threshold, wherein the second threshold may be the same or different than the first threshold), the aircraft is presumed to be in a take-off sequence, and the rotor neutral position is set to a second rotor neutral position.

Referring now to the figures, FIG. 1A illustrates an embodiment of a rotary blade aircraft (e.g., a helicopter 10). The helicopter 10 includes an airframe 15 supporting a main rotor assembly 20 and a tail rotor assembly 25. The main rotor assembly 20 and the tail rotor assembly 25 are driven by a power source, for example, one or more engines 30. Operation of the main rotor assembly 20, the tail rotor assembly 25, and the engines 30 are controlled by flight controls 35 located within a cockpit 40 of the helicopter 10. Additionally, the helicopter 10 includes landing gear assemblies 45 extending below the airframe 15 to support the helicopter 10 on a surface when not in flight. While shown in the context of a helicopter 10 with a single main rotor assembly 20 and tail rotor assembly 25, aspects of the disclosure can be used in other aircraft, including, for example, coaxial rotorcraft having propulsors, as well as fixed wing aircraft.

Figure 1B:
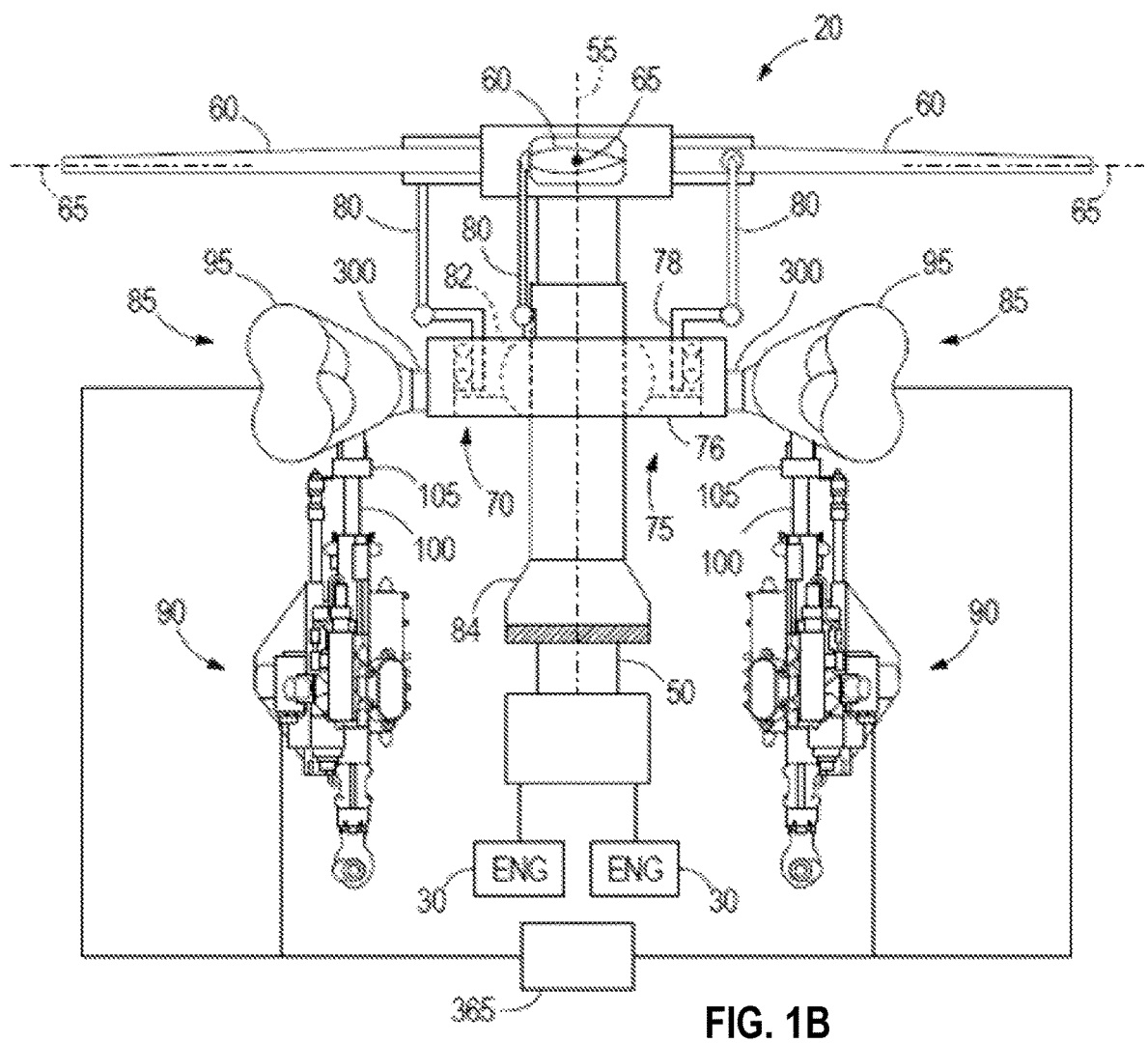
FIG. 1B illustrates a front cross-sectional view of the rotary blade aircraft of FIG. 1A according to an example embodiment.

With reference to FIGS. 1A and 1B, the main rotor assembly 20 includes a main rotor shaft 50 that is driven by at least one of the engines 30 about a main rotor axis 55. In turn, the main rotor shaft 50 drives rotor blades 60 about the main rotor axis 55. Each of the rotor blades 60 has a longitudinal axis 65 extending radially from the main rotor axis 55. In the illustrated embodiment, the main rotor assembly 20 includes four rotor blades 60; however, in other embodiments, the main rotor assembly 20 can include two or three rotor blades 60 or more than four rotor blades 60. In addition, each of the rotor blades 60 is pivotable about their longitudinal axis 65 by a swashplate assembly 70. The swashplate assembly 70 includes a control ring subassembly 75 positioned around the main rotor shaft 50. The illustrated control ring subassembly 75 includes an outer member 76 and an inner member 78 that are coupled to a uniball joint 82 that is slidable along a fixed sleeve 84 positioned around a portion of the main rotor shaft 50.

In particular, the outer member 76 does not rotate about the main rotor shaft 50 but can translate along the main rotor shaft 50 (e.g., along the fixed sleeve 84) and/or change angles relative to the main rotor shaft 50 (e.g., via the uniball joint 82). The inner member 78 is rotatable about the main rotor shaft 50 relative to the outer member 76 and moves with the outer member 76 as the outer member 76 translates along the main rotor shaft 50 and/or changes angles relative to the main rotor shaft 50. Linkages 80 are coupled between the inner member 78 and the rotor blades 60. In the illustrated embodiment, the outer member 76 is coupled to harmonic control actuators 85, and the harmonic control actuators 85 are coupled to hydraulic control servos 90. In other words, the harmonic control actuators 85 are in series between the hydraulic control servos 90 and the swashplate assembly 70. In the illustrated embodiment, each hydraulic control servo 90 is associated with one harmonic control actuator 85. Accordingly, the harmonic control actuators 85 and the hydraulic control servos 90 do not rotate with the inner member 78 of the control ring subassembly 75 and the rotor blades 60 about the main rotor axis 55 during operation of the helicopter 10. In other embodiments, the hydraulic control servos 90 can be coupled between the control ring subassembly 75 and the harmonic control actuators 85.

Figure 2A:
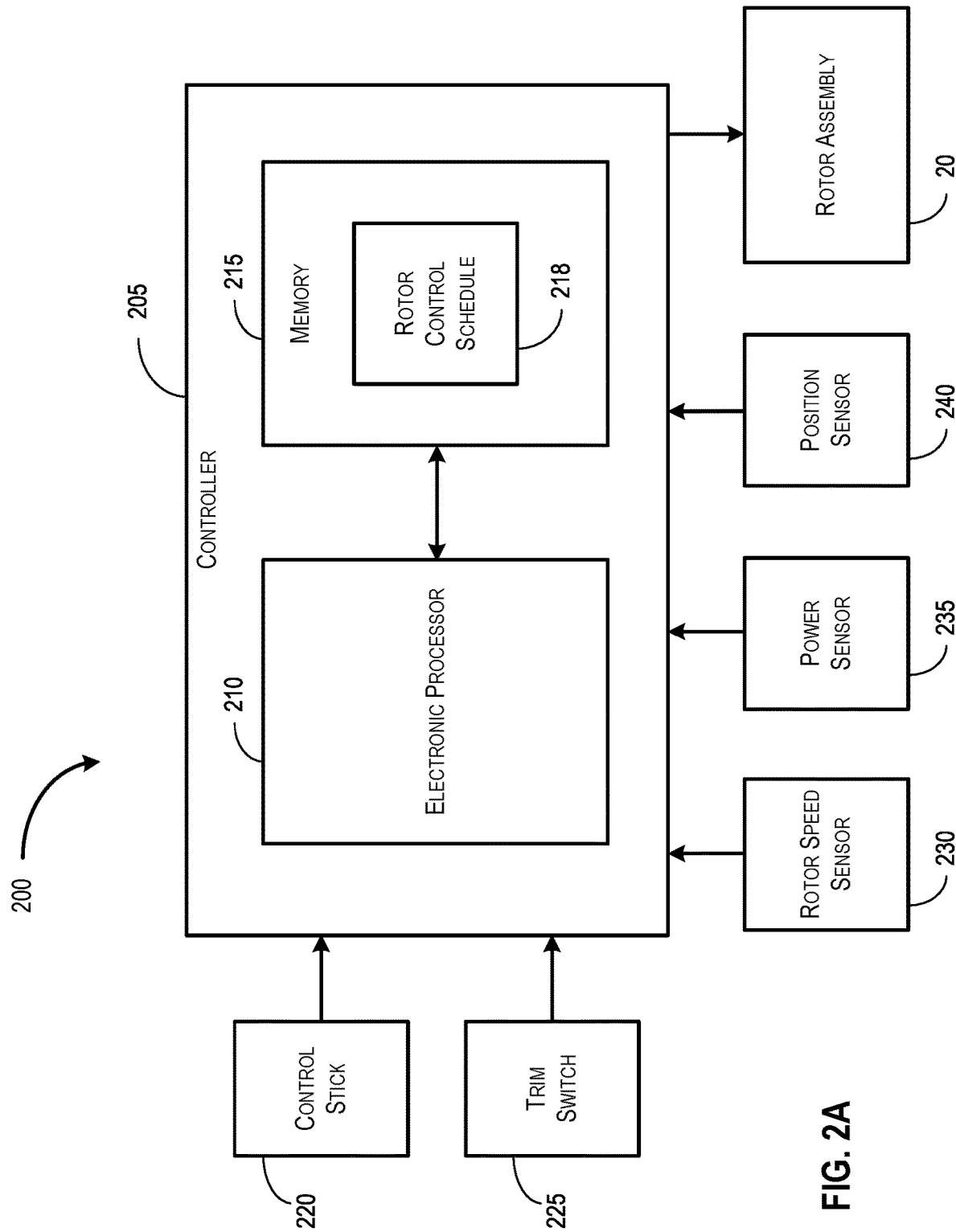
FIG. 2A illustrates a control system of the rotary blade aircraft of FIG. 1 according to an example embodiment.

FIG. 2A illustrates a control system 200 implemented within the helicopter 10 according to some embodiments. The control system 200 includes a controller 205, a control stick 220 (e.g., an input device), a trim switch 225, a rotor speed sensor 230, a power sensor 235, a position sensor 240, and the main rotor assembly 20. The controller 205 includes one or more microprocessors, digital signal processor, customized processors, and field programmable gate arrays (FPGAs) and unique stored program instructions (including both software and firmware) that controls the one or more processors to implement, in conjunction with certain non-processor circuits, the functionality described herein or a portion thereof. Alternatively, the functionality described herein, or a portion thereof, could be implemented by a state machine that has no stored program instructions, or in one or more application specific integrated circuits (ASICs), in which functionality is implemented as custom logic. Of course, a combination of the two approaches could be used.

As illustrated in FIG. 2A, in one embodiment, the controller 205 includes an electronic processor 210 (such as a programmable electronic microprocessor or similar device) and a memory 215. The electronic processor 210 executes software to control operation of the main rotor assembly 20 and the tail rotor assembly 25. The memory 215 is a non-transitory, machine-readable memory, such as a hard disk, an optical storage device, a magnetic storage device, a read-only memory (ROM), a programmable read-only memory (PROM), a random access memory (RAM), an electrically erasable programmable read-only memory (EEPROM), and a Flash memory. The memory 215 stores software executable by the electronic processor 210 to perform the control functionality and associated methods described herein, such as a rotor control scheduler 218, described in more detail below.

Figure 2B:
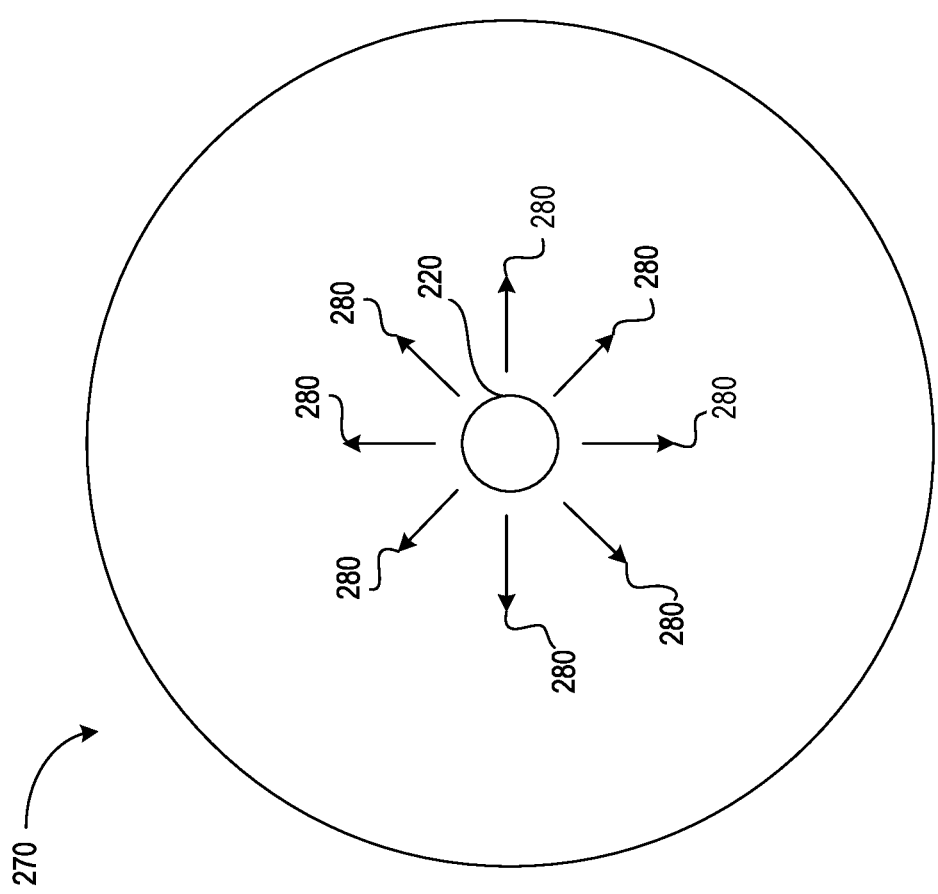
FIG. 2B illustrates a control stick of the rotary blade aircraft of FIG. 1 according to an example embodiment.

The control stick 220 may be, for example, a cyclic stick or a joystick used for flight command inputs by an operator (for example, a pilot or user) of the helicopter 10. The controller 205 controls the main rotor assembly 20 based on the position of the control stick 220. The main rotor assembly 20 may be controlled to adjust, as several non-limiting examples, the attitude of the helicopter 10, a pitch of the helicopter 10, an angular rate of the helicopter 10. FIG. 2B illustrates the control stick 220 according to one embodiment. The control stick 220 includes a range of movement 270. In the illustrated example, the range of movement 270 is a complete circumference (e.g., 360 degrees). The control stick 220 moves within the range of movement 270 in any direction (as indicated by plurality of arrows 280) under control of a pilot. When no pressure is applied to the control stick 220, the control stick 220 rests in a neutral point. In the illustrated example of FIG. 2B, the neutral point is a center of the range of movement 270. In some embodiments, when the control stick 220 is at the neutral point, the controller 205 determines that a neutral state is enabled. When the control stick 220 is not at the neutral point (for example, is being moved by a pilot), the controller 205 determines that the neutral state is not enabled.

The trim switch 225 may be used by the pilot to manually adjust the neutral position of the main rotor assembly 20. As one example, a pilot may activate the trim switch 225 to manually adjust the neutral position of the main rotor assembly 20 when the helicopter 10 moves from a take-off sequence to a hover in forward flight sequence.

As illustrated in FIG. 2A, in some embodiments, the memory 215 stores a rotor control scheduler 218. The rotor control scheduler 218 may be a software application including instructions that, when executed by the electronic processor 210, identify what rotor neutral position (from a plurality of rotor neutral positions available for selection, wherein each rotor neutral position is optimized for a particular operating sequence of the helicopter 10) to select. In some embodiments, the plurality of rotor neutral positions includes a first rotor neutral position configured for vertical takeoff of the aircraft and a second rotor neutral position configured for start-up and shutdown of the helicopter 10 (e.g., start-up and shutdown of an engine 30 of the helicopter 10). The first rotor neutral position may include a first roll angle, a first pitch angle, and a first tail rotor pitch, and the second rotor neutral position may include a second roll angle, a second pitch angle, and a second tail rotor pitch.

The control system 200 also includes a plurality of sensors configured to provide signals indicative of operating characteristics of the helicopter 10 to the controller 205. The operating characteristics are measurable values associated with current operation of the helicopter 10 (e.g., the main rotor assembly 20) and are distinct from sensed pilot inputs or settings. For example, the illustrated example provides a rotor speed sensor 230, a power sensor 235, and a position sensor 240. The rotor speed sensor 230 provides speed signals indicative of a speed of the main rotor assembly 20 to the controller 205.

The power sensor 235 provides power signals indicative of a power of an aircraft engine, such as engine 30. In some embodiments, the power sensor 235 directly measures the power of the engine 30 (for example, measures a voltage associated with the engine 30, a current associated with the engine 30, or the like). In other embodiments, the power sensor 235 detects a position of a power control lever actuated by the operator of the helicopter 10. The power control lever is actuated to control power to the engine 30.

The position sensor 240 provides position signals indicative of a position of the main rotor assembly 20. The position of the main rotor assembly 20 may include, for example, a roll rotor angle of the main rotor assembly 20, a pitch rotor angle of the main rotor assembly 20, a tail rotor pitch (for example, a pitch of the tail rotor assembly 25), or a combination thereof.

Figure 3:
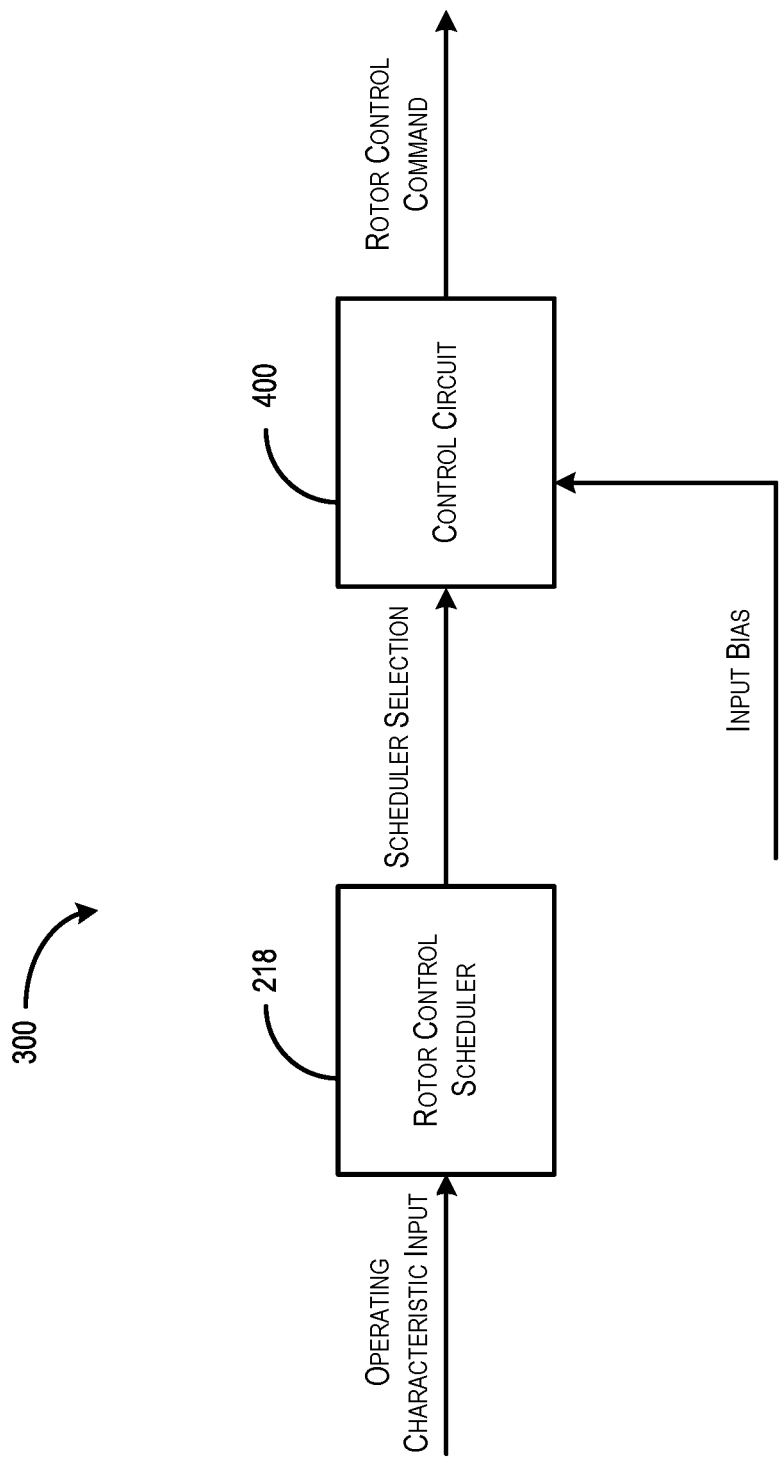
FIG. 3 illustrates a control process performed by the control system of FIG. 2A according to an example embodiment.

Operating characteristics of the helicopter 10 are utilized by the controller 205 to control the main rotor assembly 20. As one example, FIG. 3 illustrates a control operation 300 performed by the controller 205 via the rotor control scheduler 218. An operating characteristic input, such as one or more speed signals from the rotor speed sensor 230, is used as input to select, via the rotor control scheduler 218, a rotor neutral position from the available positions.

The selected rotor neutral position is set and used the reference rotor position that is combined with pilot input (i.e., input bias), provided by the pilot through movement of the control stick 220. The selected rotor neutral position and the input bias command are provided to a control circuit 400, illustrated in more detail in FIG. 4. The control circuit 400 generates and outputs a rotor control command based on the two inputs, and the main rotor assembly 20 is controlled according to the rotor control command.

Figure 4:
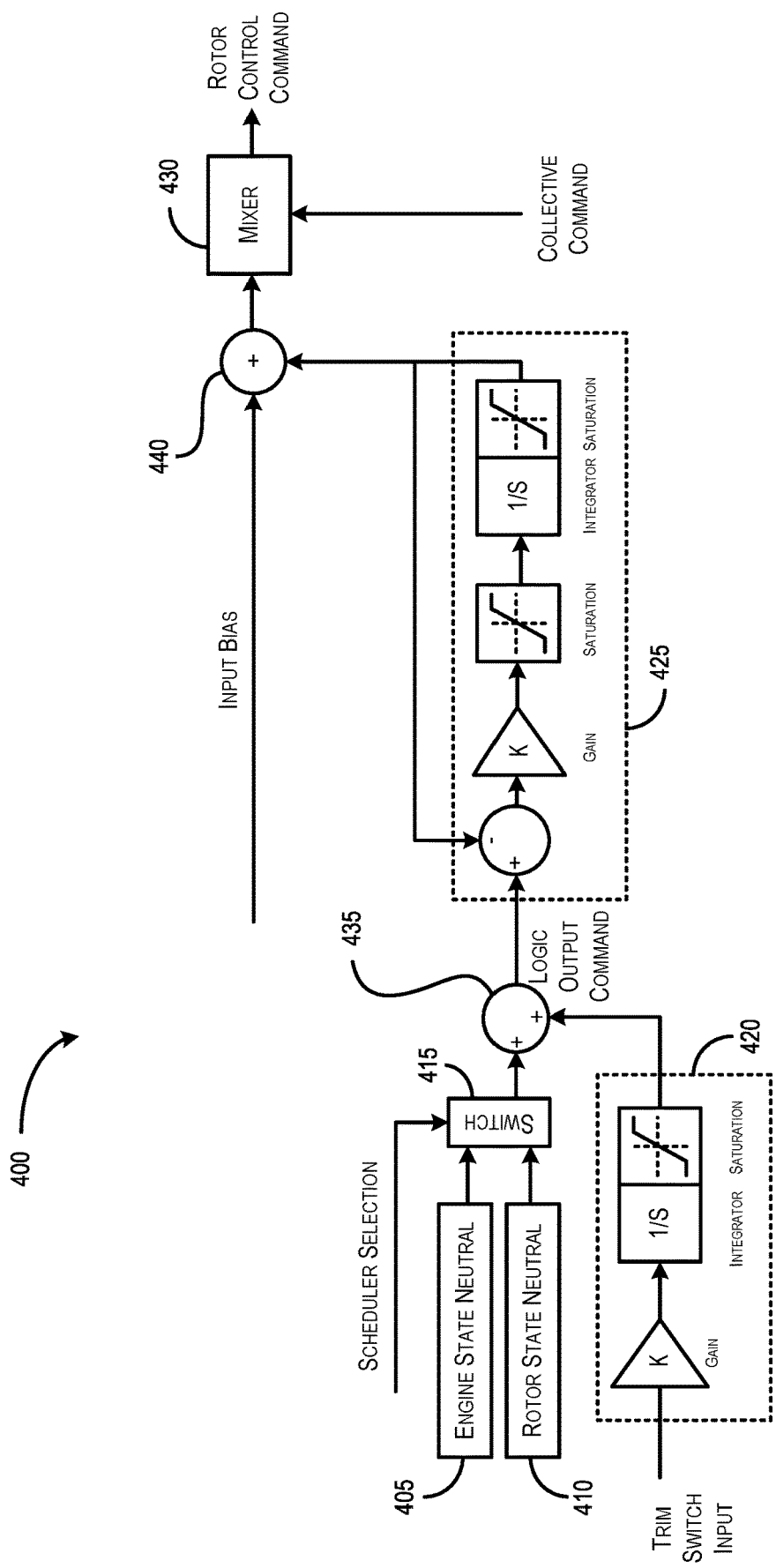
FIG. 4 depicts a control circuit for controlling a rotor assembly according to an example embodiment.

FIG. 4 illustrates an example of the control circuit 400 in more detail. The control circuit 400 provides for at least two rotor neutral position states: an engine state neutral position 405 and a rotor state neutral position 410. In the example of FIG. 4, the engine state neutral position 405 is a rotor position corresponding to an engine startup or shutdown state (e.g., an engine startup sequence or an engine shutdown sequence) of the helicopter 10. The rotor state neutral position 410 is a rotor position corresponding to a vertical take-off state (e.g., vertical take-off sequence) of the helicopter 10. As noted above, an output from the rotor control scheduler 218 indicates what particular rotor neutral position should be selected, which controls a switch 415 in the control circuit 400 to select either the engine state neutral position 405 or the rotor state neutral position 410. The selected position is then provided to a first node 435 (e.g., a logic node). In some embodiments, the switch 415 is a physical component, such as a transistor, that is driven to switch between the rotor neutral positions. In other embodiments, the switch 415 is a software component responsible for setting the selected rotor neutral position. For example, the switch 415 may be a flag set by the schedule output command, the flag indicative of either the engine state neutral position 405 or the rotor state neutral position 410.

In some embodiments, a signal from the trim switch 225 (e.g., a trim switch input, a trim control signal) is also provided to the first node 435. The first node 435 combines (e.g., sums) the trim switch input and the selected rotor neutral position into a logic output command. The logic output command represents a bias of the rotor position based on an activation of the trim switch 225 to account for external flight factors, such as wind conditions or the slope of the ground surface. In some embodiments, the trim switch input is conditioned and filtered by a first conditioning circuit 420 prior to being provided to the first node 435. In the illustrated example, the first conditioning circuit 420 includes a gain circuit, an integrating circuit, and a saturation circuit.

The logic output command is provided to a second node 440. The second node 440 combines (e.g., sums) the logic output command and the input bias command from the control stick 220. In some embodiments, the logic output command is conditioned and filtered by a second conditioning circuit 425 prior to being provided to the second node 440. The second conditioning circuit 425 includes a closed feedback loop during conditioning of the logic output command. In the illustrated example, the second conditioning circuit 425 provides an output limited and rate limited low pass filter. However, other conditioning circuits may be implemented. A mixer 430 receives the conditioned logic output command and the input bias command and generates the rotor control command for controlling the main rotor assembly 20. In some embodiments, the conditioned logic output command is also provided to the first node 435. The first node 435 subtracts the conditioned logic output command from the trim switch input and the selected rotor neutral position.

In some embodiments, the mixer 430 also receives a collective command indicative of a collective pitch control. The collective command indicates a pitch angle of the main rotor assembly 20. The collective command results in a climb or a descent of the helicopter 10. The mixer 430 generates the rotor control command based on the collective command and the combined logic output command and input bias command.

Figure 5A:
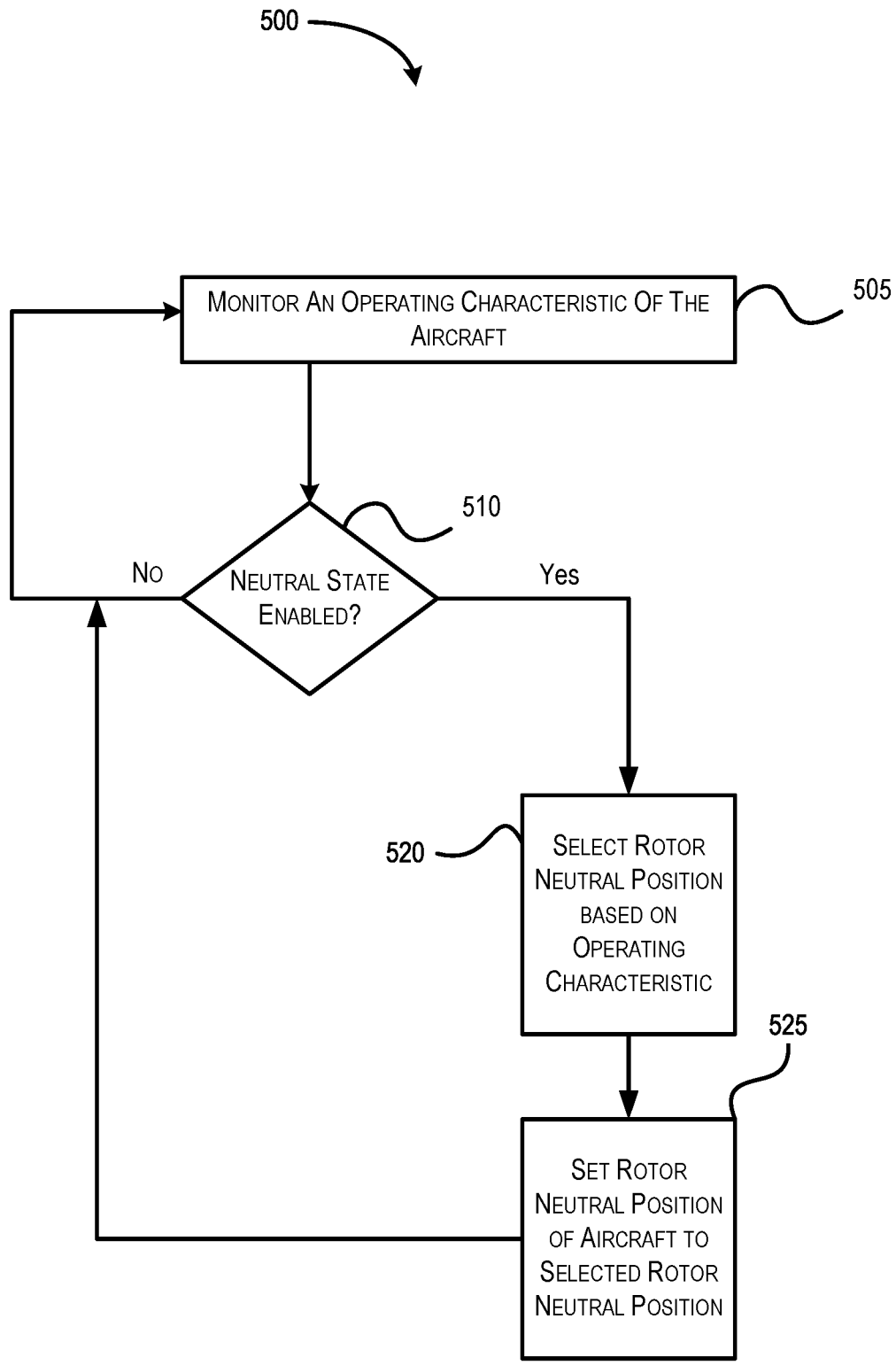
FIGS. 5A and 5B depict methods of operating a rotor assembly according to example embodiments.

FIG. 5A illustrates a method 500 for determining rotor neutral positions for the main rotor assembly 20. The method 500 is described as being executed by the controller 205. However, in some examples, aspects of the method 500 are performed by another device. For example, the functionality of the controller 205 may be distributed among multiple controllers included in the helicopter 10, among multiple controllers external to but communicatively coupled to the helicopter 10, or a combination thereof. Additionally, while the steps of method 500 are illustrated as being conducted successively, certain steps may instead be performed concurrently or in a different order. Additionally, while a specific order of steps is illustrated, in some embodiments, steps may be performed in a different order.

In some instances, the method 500 is performed as a start-up assistance operation between powering on/powering off the aircraft and taxiing the aircraft to aid in starting and shutting down the engine 30 without pilot compensation. Accordingly, rotor control (whether hydraulic or electric) may be active. Rotor control operations may be provided by either the controller 200 or a separate external support system.

As illustrated in FIG. 5A, during operation of the helicopter 10, the controller 205 monitors an operating characteristic of the helicopter 10 (at block 505). For example, the controller 205 receives speed signals from the rotor speed sensor 230 indicative of a rotational speed of the main rotor assembly 20 (e.g., a rotor speed). The controller 205 also determines whether a neutral state of the helicopter 10 is enabled (at block 510). For example, the controller 205 determines whether the control stick 220 is at the neutral point. In response to the neutral state being enabled (at block 510), the controller 205 selects, from the plurality of available rotor neutral positions, a rotor neutral position based on the monitored operating characteristic (at block 520) and sets the selected rotor neutral position as the rotor neutral position of the aircraft (at block 525). After setting the selected rotor neutral position (at block 525), the controller 205 continues monitoring the operating characteristic and determining whether the neutral state of the helicopter 10 is enabled to determine whether the helicopter 10 should be transitioned to a different rotor neutral position (e.g., a position optimized for a different operating sequence). In other words, the controller 205 selects a rotor neutral position according to both the neutral state of the helicopter 10 being enabled and whether an operating characteristic of the helicopter 10 satisfies a threshold. After a rotor neutral position is selected, the controller 205 continues to operate the helicopter 10 with the selected rotor neutral position until both the neutral state of the helicopter 10 is enabled and a new rotor neutral position is selected and set based on the operating characteristic.

Figure 5B:
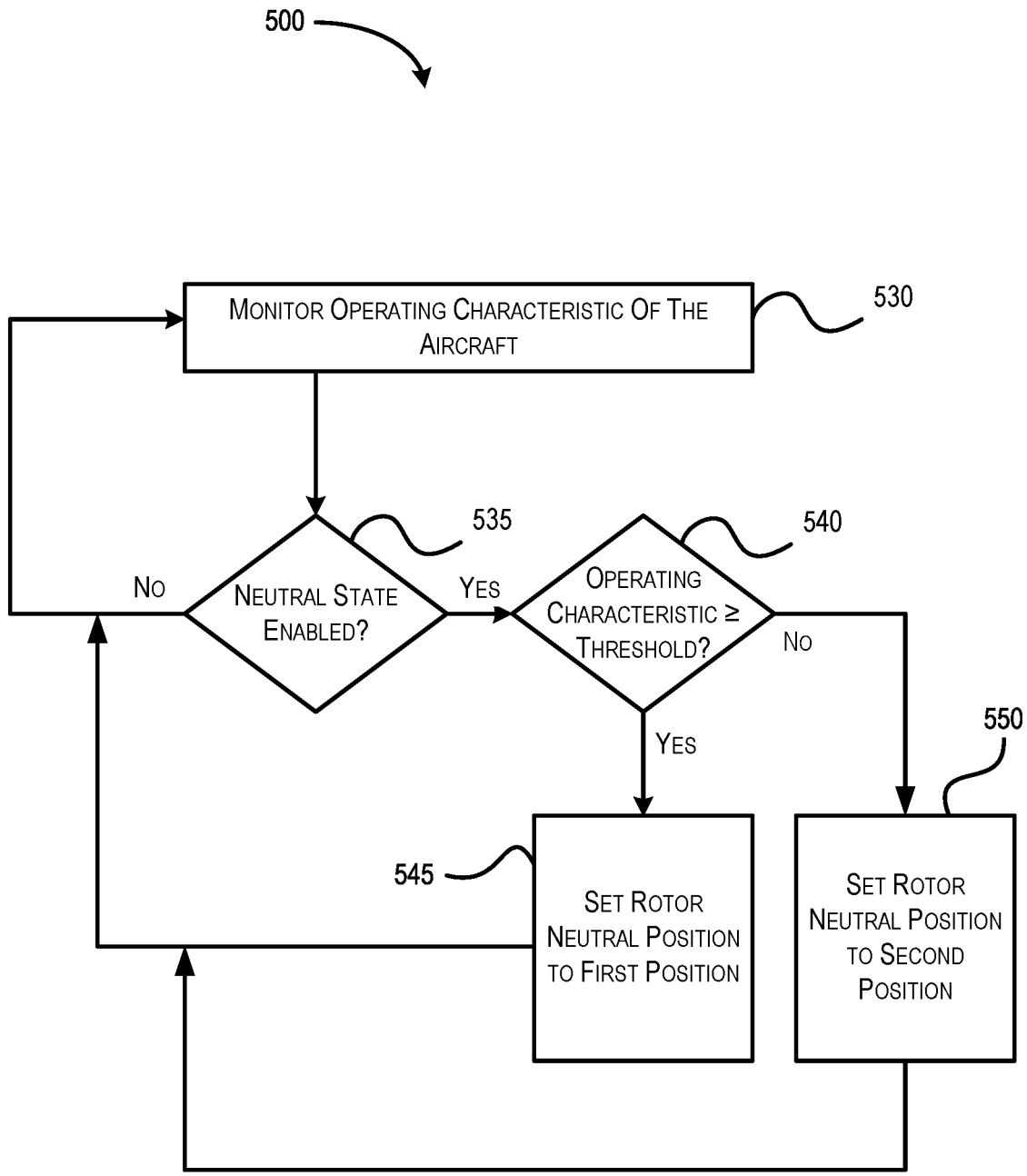

For example, in one embodiment illustrated in FIG. 5B, the controller 205 monitors an operating characteristic (at block 530) and, in response to the rotor neutral state being enabled (at block 535), the controller 205 determines whether the monitored rotor speed satisfies (for example, is greater than or equal to) an operating threshold (at block 540). For example, when the operating characteristic is a rotor speed, the controller 205 compares the rotor speed to a rotor speed threshold. In response to the rotor speed being greater than or equal to the rotor speed threshold, the controller 205 sets the rotor neutral position to a first rotor neutral position (at block 545). For example, the controller 205 may control the switch 415 to select the rotor state neutral position 410. In some instances, the first rotor neutral position corresponds to a take-off mode (e.g., a take-off sequence) of the helicopter 10. In such an instance, the rotor state neutral position 410 allows the helicopter 10 to lift vertically. After setting the rotor neutral position to the first rotor neutral position (at block 545), the controller 205 returns to block 530 and continues to monitor the operating characteristic of the helicopter 10.

Returning to block 540, when the operating characteristic does not satisfy the operating threshold (for example, the rotor speed is less than the rotor speed threshold), the controller 205 sets the rotor neutral position to a second rotor neutral position (at block 550). For example, the controller 205 may control the switch 415 to select the engine state neutral position 405. In some instances, the second rotor neutral position corresponds to an engine startup/shutdown mode (e.g., an engine startup/shutdown sequence) of the helicopter 10. In such an instance, the engine state neutral position 405 ensures the main rotor assembly 20 droops and is restrained at a low rotational speed.

It should be understood that a rotor neutral position can be selected based on operating characteristics other than rotor speed. For example, in some implementations, the operating characteristic monitored by the controller 205 (at blocks 505) is the power of the engine 30 indicated by the power signals from the power sensor 235. Accordingly, the controller 205 compares the engine power to a power threshold (at block 515) to determine whether to transition between the first operating mode and the second operating mode.

In other implementations, the operating characteristic monitored by the controller 205 (at block 505) is a position of the main rotor assembly 20 indicated by position signals from the position sensor 240. The controller 205 compares the position of the main rotor assembly 20 to a position threshold (at block 515) to determine whether to transition between the first operating mode and the second operating mode.

Also, in some embodiments, a combination of operating characteristics may be used by the controller 205 to determine when to switch from one rotor neutral position to another. Also, in some embodiments, more than two different rotor neural positions may be used, and the controller 205 can be configured to transition between the positions based on one or more operating characteristics of the helicopter 10.

Accordingly, embodiments described herein provide methods and systems for automatically selecting a rotor neutral position of an aircraft as a function of one or more operating characteristics. The selected rotor neutral position can be one of a plurality of available positions, wherein each available rotor neutral position is optimized for a particular operating sequence of the aircraft, such as, for example, take-off and engine start-up/shutdown. Automatically selecting the appropriate rotor neutral positions reduces pilot workload and results in repeatable positions that avoid inconsistent or erroneous transitions between sequences.

Various features and advantages of the embodiments described herein are set forth in the following claims.

What is claimed is:

1. An aircraft comprising:
a rotor assembly; and
a controller, the controller configured to:
monitor an operating characteristic of the aircraft, and
select, in response to a rotor neutral state of the aircraft being enabled, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft, and
set the selected one of the plurality of rotor neutral positions as the rotor neutral position for the aircraft.

2. The aircraft of claim 1, wherein the operating characteristic is rotor speed.

3. The aircraft of claim 1, wherein the operating characteristic is engine power.

4. The aircraft of claim 1, wherein the operating characteristic is a pitch of the rotor assembly.

5. The aircraft of claim 1, wherein the first rotor neutral position includes a first roll angle and a first pitch angle, and wherein the second rotor neutral position includes a second roll angle and a second pitch angle.

6. The aircraft of claim 1, wherein the aircraft further includes an input device, and wherein the controller is further configured to:
receive an input bias command from the input device, and
adjust control of the rotor assembly based on the input bias command and the selected one of the plurality of rotor neutral positions set as the rotor neutral position for the aircraft.

7. The aircraft of claim 1, wherein the controller is configured to select the one of the plurality of rotor neutral positions based on the operating characteristic by:
comparing the operating characteristic to an operating threshold,
selecting the first rotor neutral position in response to the operating characteristic of the aircraft being greater than the operating threshold, and
selecting the second rotor neutral position in response to the operating characteristic of the aircraft being below the operating threshold.

8. A method for operating an aircraft, the method comprising:
monitoring, with a controller, an operating characteristic of the aircraft;
selecting, with the controller in response to a rotor neutral state being enabled for the aircraft, one of a plurality of rotor neutral positions based on the operating characteristic, the plurality of rotor neutral positions including a first rotor neutral position configured for vertical takeoff of the aircraft and a second rotor neutral position configured for start-up and shutdown of the aircraft, and
setting the selected one of the plurality of rotor neutral positions as the rotor neutral position for the aircraft.

9. The method of claim 8, further comprising:
receiving a trim control signal from a trim switch, and
adjusting the selected one of the plurality of rotor neutral positions based on the trim control signal.

10. The method of claim 8, wherein selecting the one of the plurality of rotor neutral positions based on the operating characteristic includes
comparing the operating characteristic to an operating threshold, and
selecting the first rotor neutral position in response to the operating characteristic of the aircraft being greater than the operating threshold.

11. The method of claim 8, wherein selecting the one of the plurality of rotor neutral positions based on the operating characteristic includes
comparing the operating characteristic to an operating threshold, and
selecting the second rotor neutral position in response to the operating characteristic of the aircraft being below the operating threshold.

12. The method of claim 8, further comprising:
receiving an input bias command from an input device, and
adjusting control of a rotor assembly of the aircraft based on the input bias command and the selected one of the plurality of rotor neutral positions set as the rotor neutral position for the aircraft.

13. The method of claim 8, wherein monitoring the operating characteristic includes monitoring rotor speed.

14. The method of claim 8, wherein monitoring the operating characteristic includes monitoring engine power.

15. The method of claim 8, wherein monitoring the operating characteristic includes monitoring a pitch of a rotor assembly.

16. A control system comprising:
a sensor configured to provide signals indicative of an operating characteristic of an aircraft; and
a controller including an electronic processor and a memory, the controller configured to:
receive the signals indicative of the operating characteristic, select, in response to a rotor neutral state being enabled, one of a plurality of rotor neutral positions based on the operating characteristic, the plurality of rotor neutral positions including a first rotor neutral position configured for vertical takeoff of the aircraft and a second rotor neutral position configured for startup and shutdown of the aircraft, and set the selected one of the plurality of rotor neutral positions as the rotor neutral position for the aircraft.

17. The control system of claim 16, wherein the operating characteristic is rotor speed.

18. The control system of claim 16, wherein the operating characteristic is engine power.

19. The control system of claim 16, wherein the operating characteristic is a pitch of a rotor assembly of the aircraft.

20. The control system of claim 16, wherein the first rotor neutral position includes a first roll angle and a first pitch angle, and wherein the second rotor neutral position includes a second roll angle and a second pitch angle.

* * * * *